US012544301B2

(12) United States Patent
Wu

(10) Patent No.: US 12,544,301 B2
(45) Date of Patent: Feb. 10, 2026

(54) CLITORAL SUCKER

(71) Applicant: Xiaoxuan Wu, Guangdong (CN)

(72) Inventor: Xiaoxuan Wu, Guangdong (CN)

(*) Notice: Subject to any disclaimer, the term of this patent is extended or adjusted under 35 U.S.C. 154(b) by 0 days.

(21) Appl. No.: 18/793,316

(22) Filed: Aug. 2, 2024

(65) Prior Publication Data

US 2026/0034022 A1 Feb. 5, 2026

(51) Int. Cl.
*A61H 19/00* (2006.01)
*A61H 9/00* (2006.01)

(52) U.S. Cl.
CPC ........... *A61H 19/34* (2013.01); *A61H 9/0057* (2013.01); *A61H 2201/0169* (2013.01); *A61H 2201/1246* (2013.01); *A61H 2201/5056* (2013.01)

(58) Field of Classification Search
CPC ........ A61H 19/34; A61H 19/44; A61H 19/50; A61H 19/30; A61H 19/32; A61H 9/0057; A61H 2009/0064; A61H 2001/1246; A61H 2201/5056
See application file for complete search history.

(56) References Cited

U.S. PATENT DOCUMENTS

2023/0320924 A1* 10/2023 Zhou .................... A61H 9/0057 601/6

FOREIGN PATENT DOCUMENTS

CN 104812355 U 7/2015
CN 209422424 U 9/2019

* cited by examiner

*Primary Examiner* — Christine H Matthews
(74) *Attorney, Agent, or Firm* — Justin Lampel

(57) ABSTRACT

The present disclosure provides a clitoral sucker. The clitoral sucker includes: a housing, including a body and a sucking portion disposed on the body, where the body is provided with an inner cavity, and the sucking portion is provided with a sucking opening connected to the inner cavity; a negative pressure mechanism, including a piston assembly and a guide member, where the guide member is disposed in the inner cavity, the piston assembly is disposed in the inner cavity, partially extends into the guide member, and is configured to generate a negative pressure in the sucking opening. Due to the design of the piston assembly and the guide member, the piston assembly has a large movement path, and a greater negative pressure can be generated in the sucking opening. This significantly improves user experience.

8 Claims, 9 Drawing Sheets

CLITORAL SUCKER

TECHNICAL FIELD

The present disclosure relates to the field of sex toys, and in particular to a clitoral sucker.

BACKGROUND

With the development of science and technology as well as our emphasis on personal pleasure experience, various sex toys emerge. As an important sex toy, a clitoral sucker can simulate an oral sucking action to provide a strong sense of pleasure. Therefore, the clitoral sucker has been widely welcomed. However, clitoral suckers available on the market still have specific limitations in design and functions, especially in terms of a magnitude and persistence of a sucking force. As a result, the needs of users cannot be completely satisfied.

In existing technical solutions, a layer of soft silicone is generally disposed inside a sucking opening, and the soft silicone seals a sucking channel, forming an air cavity. Due to squeezing of an inner movable component on the soft silicone, the air cavity is deformed to generate a negative pressure in the air cavity, and a sucking force is generated when the sucking opening is fitted to a genital area.

However, this design has obvious shortcomings. First, due to the deformation of the soft silicone is limited, the negative pressure is relatively small, and the sucking force is not sufficient to provide strong sucking experience. Second, due to a fatigue feature of a silicone material, the sucking force may gradually decrease in long-time use, which affects user experience. In addition, the soft silicone may be damaged while movable components are used frequently for a long time.

SUMMARY

In view of this, it is necessary to provide a clitoral sucker having a strong sucking force, to resolve the above problem.

An embodiment of the present disclosure provides a clitoral sucker. The clitoral sucker includes:

- a housing, including a body and a sucking portion disposed on the body, where the body is provided with an inner cavity, and the sucking portion is provided with a sucking opening connected to the inner cavity;
- a negative pressure mechanism, including a piston assembly and a guide member, where the guide member is disposed in the inner cavity, and the piston assembly is disposed in the inner cavity, partially extends into the guide member, and is configured to move back and forth along a direction of the sucking opening, to generate a negative pressure in the sucking opening.

In at least one embodiment of the present disclosure, the piston assembly includes a driving member and a movable member, the movable member extends into the guide member and is attached to an inner wall of the guide member, and the driving member drives the movable member to move along the direction of the sucking opening.

In at least one embodiment of the present disclosure, the sucking opening extends along a sucking direction to form an extension portion, and the extension portion is attached to the guide member; and

- when the movable member moves along the sucking direction, the movable member pushes a pushing portion, and configured to change a size of the sucking opening.

In at least one embodiment of the present disclosure, the movable member includes the pushing portion and a connection portion that are disposed in sequence along the sucking direction, and an end of the connection portion is disposed on the driving member;

- the pushing portion has one end disposed on the connection portion and the other end extending along a direction close to the sucking opening, obliquely disposed, and abutting against the inner wall of the guide member; and
- the sucking opening is a flexible layer, and when the piston assembly moves, one end, away from the connection portion, of the pushing portion pushes the extension portion, to change the size of the sucking opening.

In at least one embodiment of the present disclosure, an included angle between the pushing portion and the guide member is defined as a, and $30° \leq a \leq 60°$.

In at least one embodiment of the present disclosure, the movable member further includes a first sealing portion, and the first sealing portion is disposed at an end, close to the sucking opening, of the pushing portion, and abuts against the inner wall of the guide member.

In at least one embodiment of the present disclosure, the clitoral sucker further includes a flow rate adjustment assembly, where the flow rate adjustment assembly is disposed in the guide member and attached to the inner wall of the guide member;

- the flow rate adjustment assembly includes a holder, and a first flow-limiting valve and a second flow-limiting valve that are disposed on the holder; and
- the first flow-limiting valve and the second flow-limiting valve are disposed on two sides of the holder along a centerline of the holder, and are both movably connected to the holder.

In at least one embodiment of the present disclosure, the first flow-limiting valve includes a first windshield portion, a first connection portion, and a first limiting portion that are connected in sequence, and the second flow-limiting valve includes a second windshield portion, a second connection portion, and a second limiting portion that are connected in sequence;

- the first windshield portion is disposed on a side, away from the sucking opening, of the holder, and when the piston assembly moves along a direction close to the sucking opening, the first windshield portion is attached to the holder;
- the second windshield portion is disposed on a side, close to the sucking opening, of the holder, and when the piston assembly moves along a direction away from the sucking opening, the second windshield portion is attached to the holder; and
- both the first limiting portion and the second limiting portion are configured to limit a movement distance of the flow limiting valve.

In at least one embodiment of the present disclosure, the piston assembly further includes a sealing strip, the movable member is provided with an annular sealing groove, and the sealing strip is disposed in the annular sealing groove and connected to the annular sealing groove in an interference fit manner.

In at least one embodiment of the present disclosure, the sealing strip includes a fixing portion and a second sealing portion, the fixing portion is attached to the annular sealing groove, and the second sealing portion has one end disposed on the fixing portion and the other end obliquely disposed along a sucking direction and attached to the guide member; and the piston assembly includes two the sealing strips, and the two the sealing strips are disposed in a mirror manner along the sucking direction.

The clitoral sucker adopts the design of the piston assembly and the guide member, and has no flexible silicone. Therefore, the piston assembly is connected to the inner cavity, and the movement path of the piston assembly is large, so that a large negative pressure can be generated in the sucking opening. This significantly improves pleasure experience of users. In addition, due to a mechanical structure design of the piston assembly and the guide member, it prevents fatigue of soft silicone materials in long-time high-frequency operations, so that continuous stability of the sucking force is ensured.

REFERENCE NUMERALS

Figure 1:
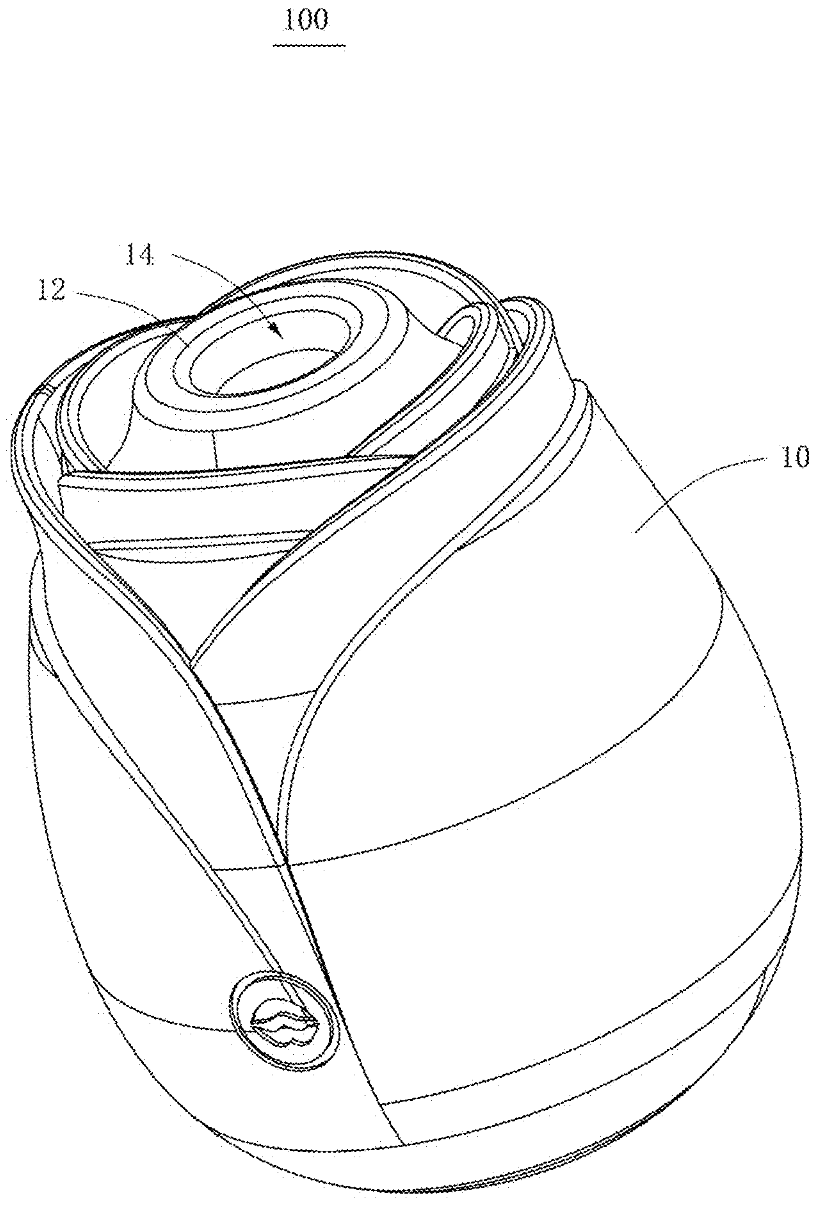
FIG. 1 is a three-dimensional view of a clitoral sucker according to an embodiment of the present disclosure.

100: clitoral sucker; 10: housing; 11: body; 12: sucking portion; 13: inner cavity; 14: sucking opening; 141: extension portion; 20: negative pressure mechanism; 21: piston assembly; 211: driving member; 212: movable member; **212*a*: pushing portion; 212*b*: connection portion; 212*c*: first sealing portion; 22: guide member; 23: sealing strip; 231: fixing portion; 232: second sealing portion; 24: sealing groove; 30: flow rate adjustment assembly; 31: holder; 32: first flow-limiting valve; 321: first windshield portion; 322: first connection portion; 323: first limiting portion; 33: second flow-limiting valve; 331: second windshield portion; 332: second connection portion; 333**: second limiting portion.

DETAILED DESCRIPTION OF THE EMBODIMENTS

The technical solutions in the embodiments of the present disclosure are described below with reference to the accompanying drawings in the embodiments of the present disclosure. It is apparent that the described embodiments are merely some rather than all of the embodiments of the present disclosure.

It should be noted that when a component is “connected” to another component, the component may be connected to the another component directly, or indirectly via an intermediate component. When a component is “arranged on” another component, the component may be directly arranged on the another component or there may be an intermediate component. The terms “top”, “bottom”, “upper”, “lower”, “left”, “right”, “front”, “rear”, and similar expressions used in this specification are used for illustrative purposes only.

An embodiment of the present disclosure provides a clitoral sucker. The clitoral sucker includes: a housing and a negative pressure mechanism.

The housing includes a body and a sucking portion disposed on the body. The body is provided with an inner cavity, and the sucking portion is provided with a sucking opening connected to the inner cavity.

The negative pressure mechanism includes a piston assembly and a guide member. The guide member is disposed in the inner cavity, and the piston assembly is disposed in the inner cavity, partially extends into the guide member, and is configured to move back and forth along a direction of the sucking opening, to generate a negative pressure in the sucking opening.

The clitoral sucker adopts the design of the piston assembly and the guide member, and has no flexible silicone. Therefore, the piston assembly is connected to the inner cavity, and the movement path of the piston assembly is large, so that a large negative pressure can be generated in the sucking opening. This significantly improves pleasure experience of users. In addition, due to a mechanical structure design of the piston assembly and the guide member, it prevents fatigue of soft silicone materials in long-time high-frequency operations, so that continuous stability of the sucking force is ensured.

Some embodiments of the present disclosure are described in detail below with reference to the accompanying drawings. If no conflict occurs, the following embodiments and features of the embodiments may be combined with each other.

Figure 2:
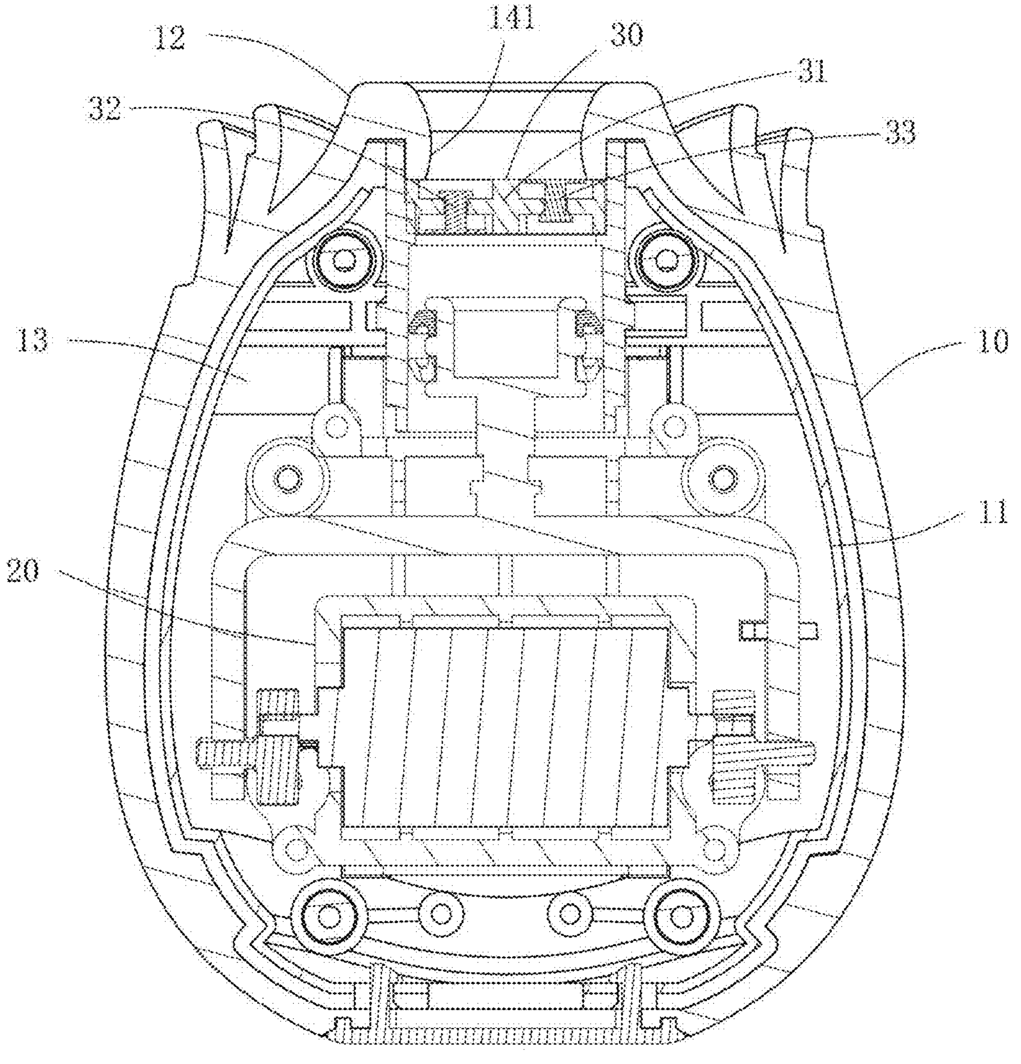
FIG. 2 is a profile of the clitoral sucker in FIG. 1; min

Referring to FIG. 1 and FIG. 2, an embodiment of the present disclosure provides a clitoral sucker. The clitoral sucker 100 includes: a housing 10 and a negative pressure mechanism 20.

The housing 10 includes a body 11 and a sucking portion 12 disposed on the body 11. The body 11 is provided with an inner cavity 13, and the sucking portion 12 is provided with a sucking opening 14 connected to the inner cavity 13.

Figure 3:
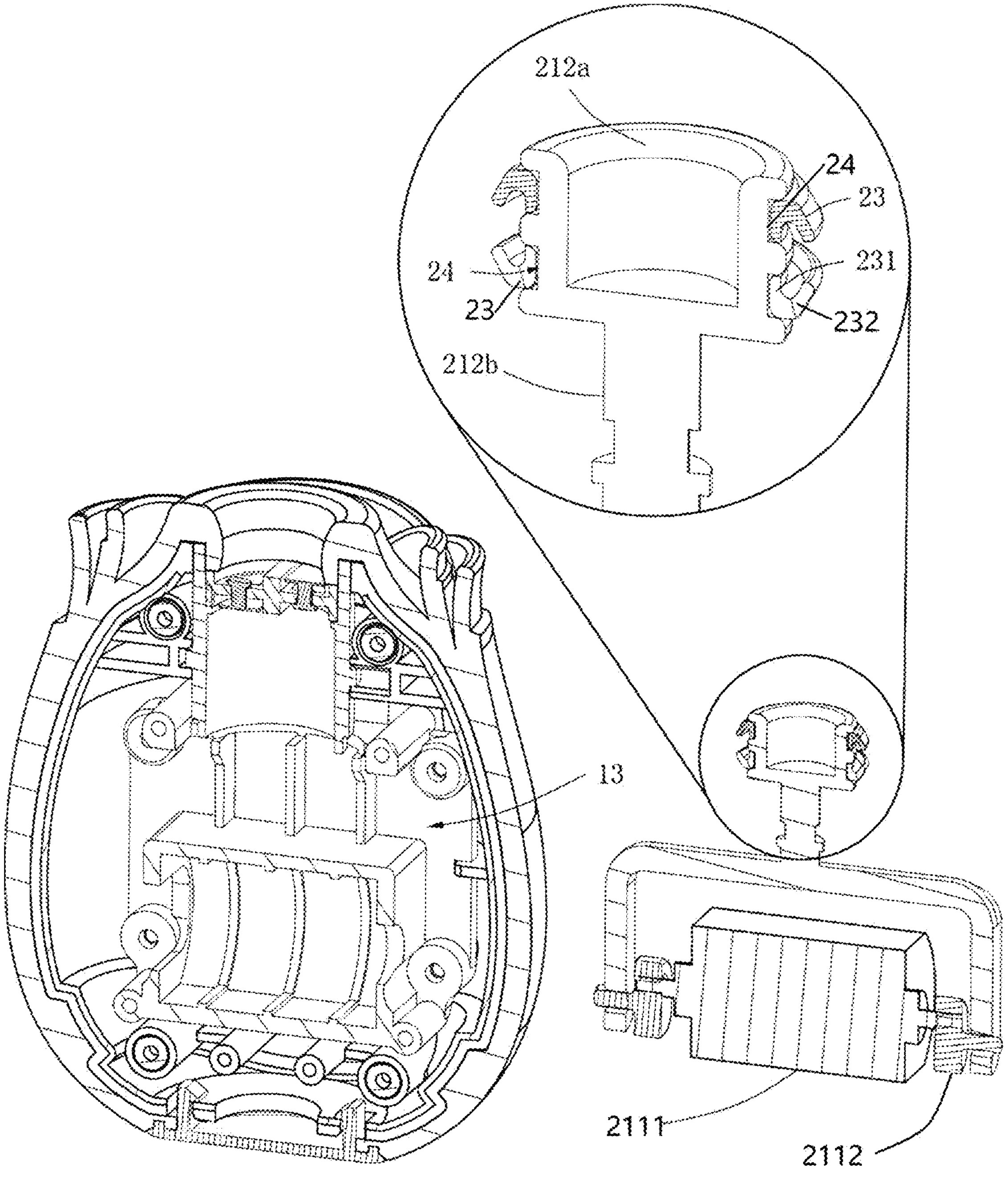
FIG. 3 is a three-dimensional exploded view of the clitoral sucker in FIG. 1.
Figure 4:
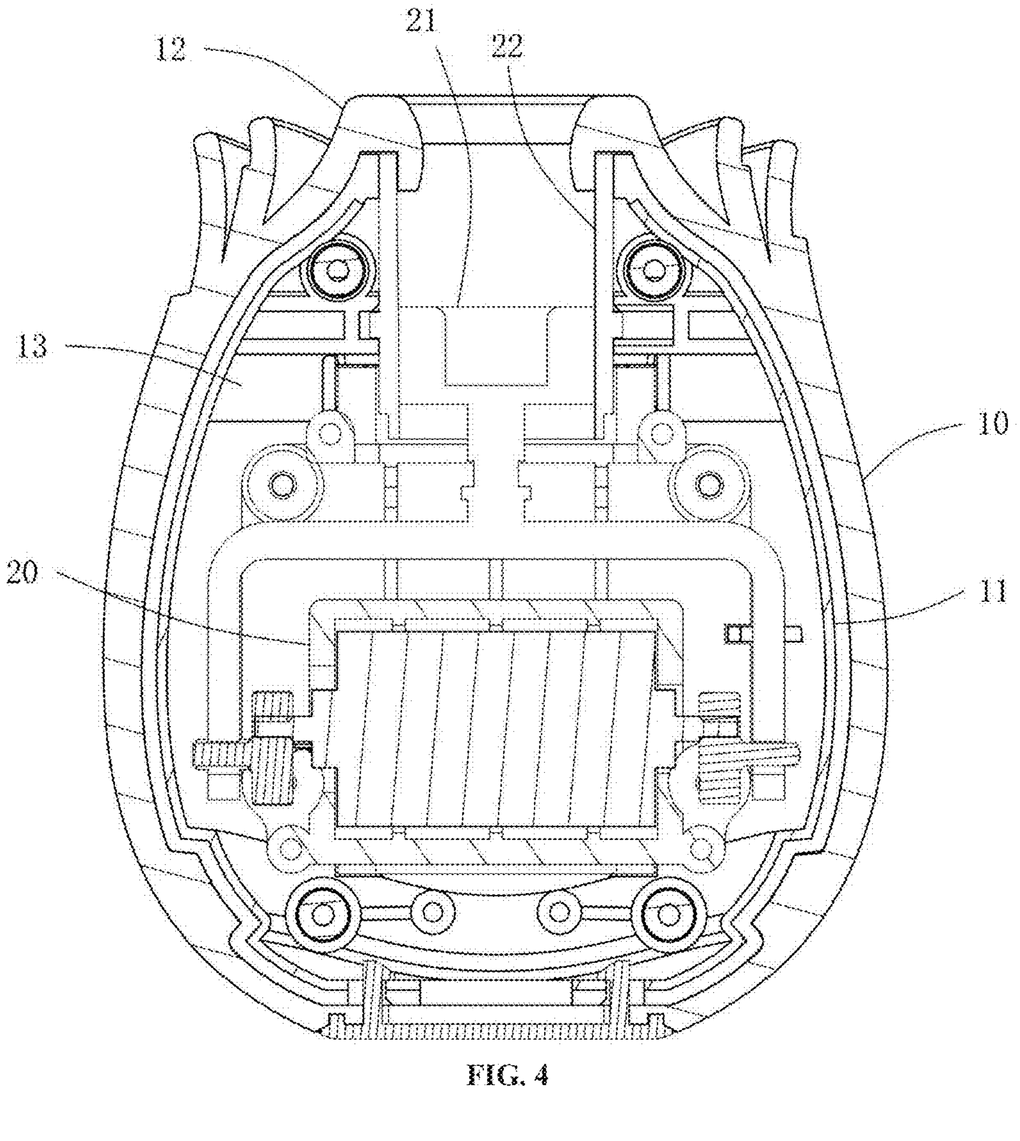
FIG. 4 is a schematic diagram of a structure of a flow rate adjustment assembly of the clitoral sucker in FIG. 1.

Referring to FIGS. 3-4, the negative pressure mechanism 20 includes a piston assembly 21 and a guide member 22. The guide member 22 is disposed in the inner cavity 13, and the piston assembly 21 is disposed in the inner cavity 13, partially extends into the guide member 22, and is configured to move back and forth along a direction of the sucking opening 14, to generate a negative pressure in the sucking opening 14.

Specifically, the body 11 is a main part of the clitoral sucker, and provided with the inner cavity 13. The sucking portion 12 is disposed on a part of the body 11, and provided with the sucking opening 14. The sucking opening 14 is connected to the inner cavity 13, and configured to be fitted to a genital area of the user, to form confined space. The piston assembly 21 is disposed in the inner cavity 13, partially extends into the guide member 22, and is configured to move back and forth in a direction of the sucking opening 14. The guide member 22 is disposed in the inner cavity 13, and configured to guide and limit a movement track of the piston assembly 21, to ensure that the piston assembly 21 moves along a preset path.

Further, because of the reciprocating movement of the piston assembly 21 in the inner cavity 13, especially because a conventional method for sealing with soft silicone is not used in the design, the negative pressure is generated via the design of the piston assembly 21, so that better negative pressure effect can be implemented in the sucking opening 14. This design can more effectively simulate an oral sucking action, to provide strong stimulation and sense of pleasure.

Further, because of optimization of the mechanical structure design of the piston assembly 21 and the guide member 22, fatigue and damage of the conventional soft silicone in long-time use are avoided. Therefore, the clitoral sucker can maintain continuous stability of the sucking force, and performance and effectiveness of the clitoral sucker may not be affected due to aging of materials. This ensures that the user can always enjoy consistent sucking experience during use.

Further, the button is disposed on the body for the user to input a control signal. The button is generally used for a switching device, controlling a power supply, adjusting sucking strength, switching a mode, and the like. The user may conveniently operate the clitoral sucker. By means of the button, the user can control starting and shutdown of the clitoral sucker, adjust the sucking strength, and switch different operation modes (for example, a pulse mode, a continuous mode, and the like).

In conclusion, this design can provide strong sucking effect, and adapt to physical features and needs of different users. The movement path of the piston assembly 21 may be adjusted based on usage habits and preferences of the user, thereby implementing personalized sucking experience and enhancing market competitiveness and user satisfaction of the clitoral sucker.

Figure 5:
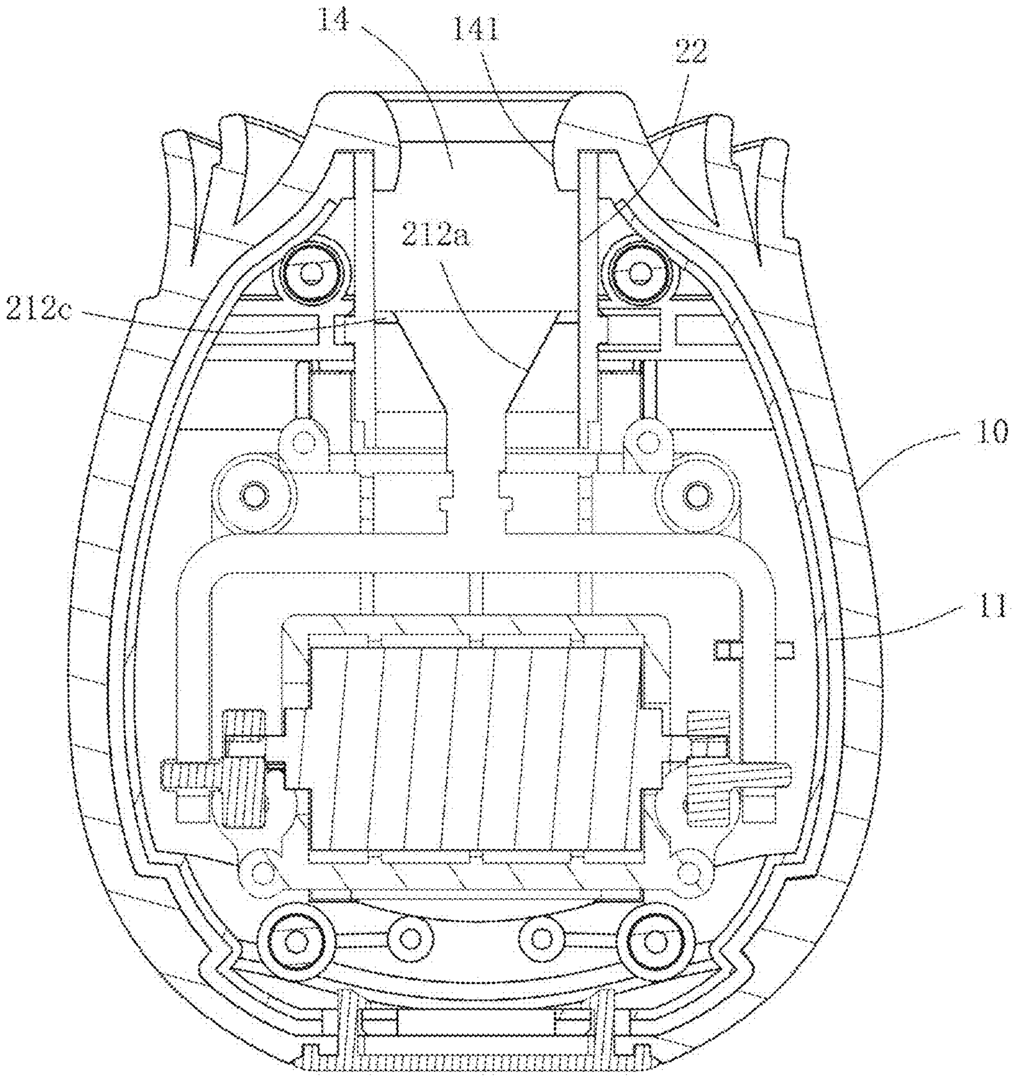
FIG. 5 is a schematic diagram of a structure of a profile of an obliquely disposed pushing portion of the clitoral sucker in FIG. 1.
Figure 6:
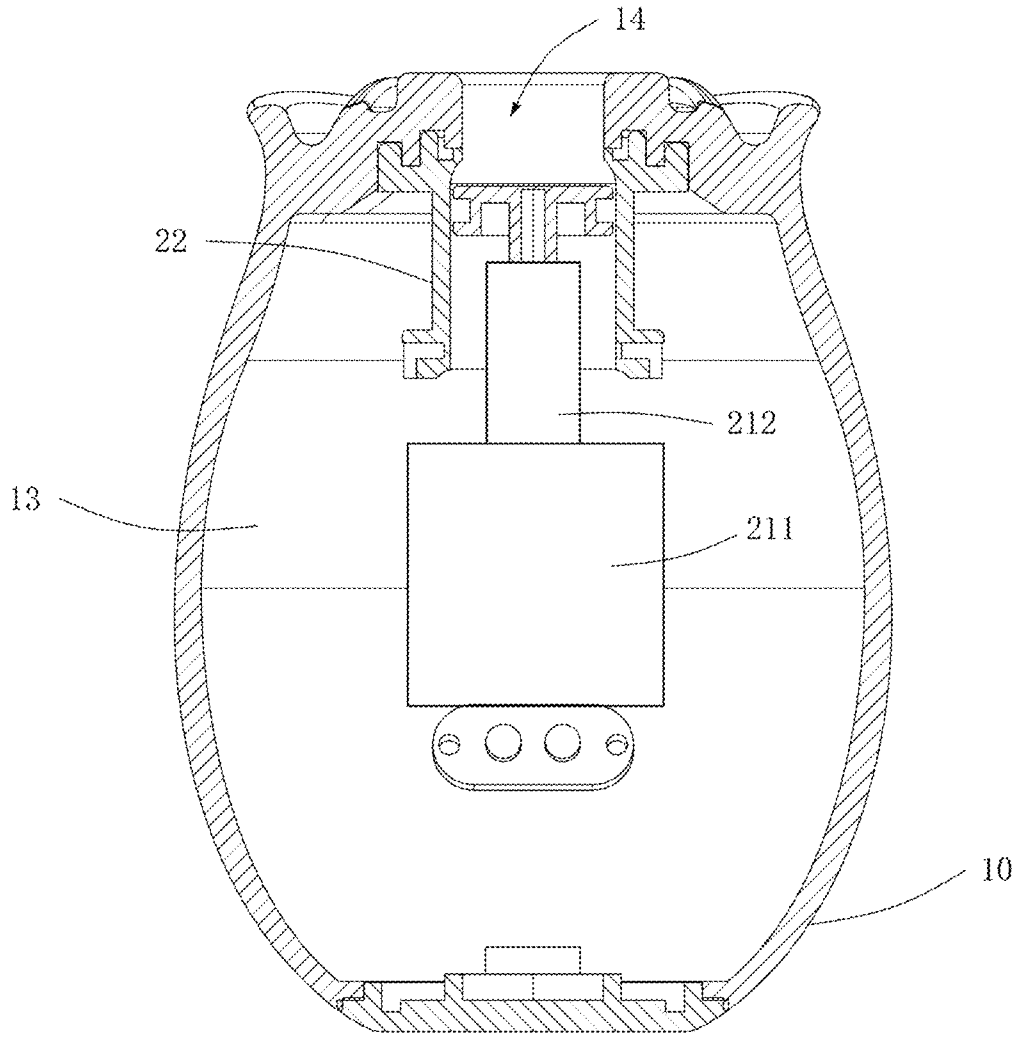
FIG. 6 is a schematic diagram of a structure of an up-and-down moving piston of the clitoral sucker in FIG. 1.
Figure 7:
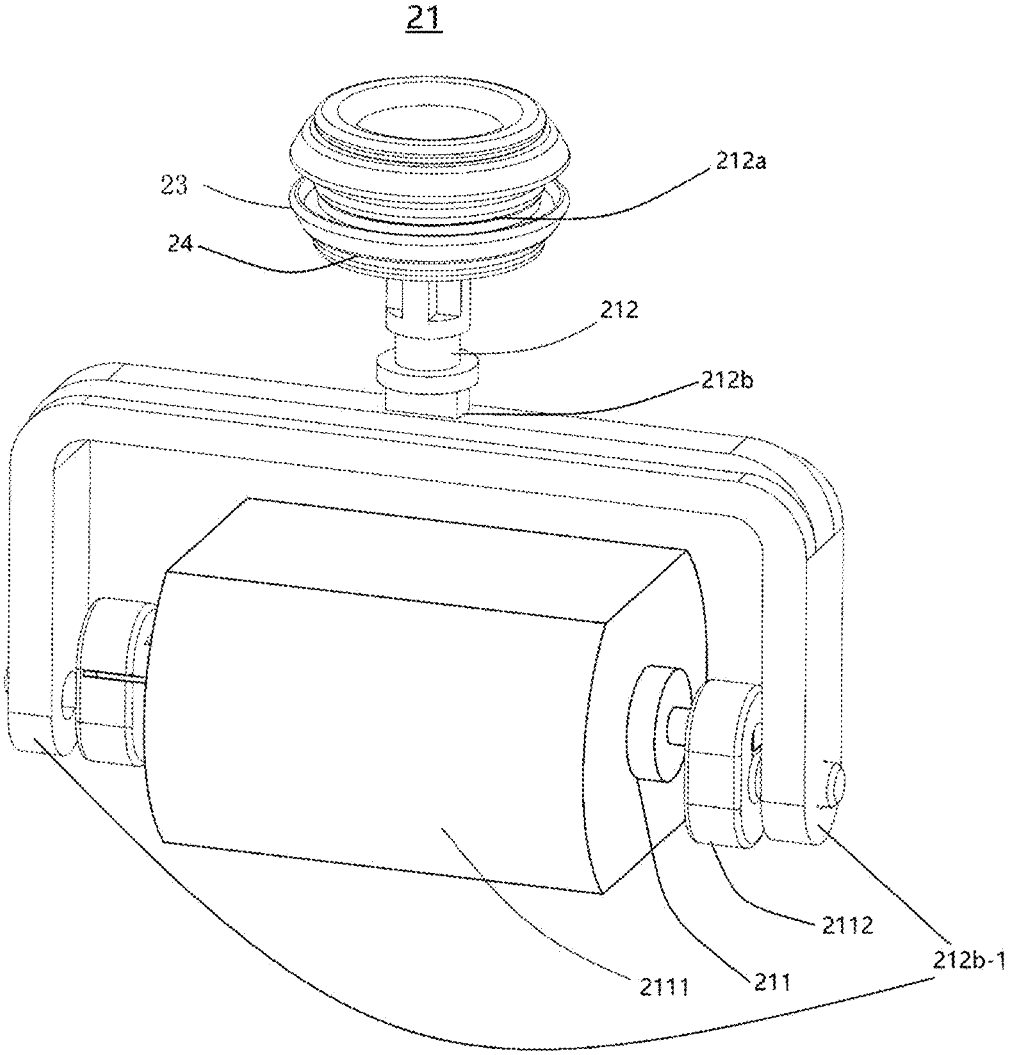
FIG. 7 is an exploded view of a piston assembly of the clitoral sucker in FIG. 1.

Referring to FIGS. 5-7, in a specific embodiment, the piston assembly 21 includes a driving member 211 and a movable member 212. The movable member 212 extends into the guide member 22 and is attached to an inner wall of the guide member 22, and the driving member 211 drives the movable member 212 to move along the direction of the sucking opening 14.

Specifically, the driving member 211 is a central part of the piston assembly 21, and mainly configured to enable the movable member 212 to move along the direction of the sucking opening 14 by means of driving of an external force or a mechanical device. This design can precisely control the movement track and a movement speed of the movable member 212, thereby adjusting the negative pressure effect in the sucking opening 14, to enhance comfort and pleasure experience of the user. The driving member 211 is generally driven by driving force sources such as a motor 2111, a pneumatic device, or a manual operation. When the driving member 211 is started, the driving member 211 transfers power to the movable member 212, to enable the movable member 212 to be attached to the inner wall of the guide member 22 and moves along the direction of the sucking opening 14. During movement, the negative pressure in the clitoral sucker can be effectively adjusted and controlled, to meet different needs and experience requirements of the user.

Further, the movable member 212 is a movable member of the piston assembly 21, and is designed to be fitted to the inner wall of the guide member 22 and move in the direction of the sucking opening 14. This design ensures that the piston assembly 21 stably and effectively generates the negative pressure during movement, to enhance sucking effect and stability of the clitoral sucker. The movable member 212 generally has a shape and size that match the inner wall of the guide member 22, to enable the movable member 212 to move smoothly and maintain sealing during movement. The driving member 211 drives, by means of mechanically connecting or directly driving, the movable member 212 to move along the direction of the sucking opening 14, thereby generating desired negative pressure effect in the clitoral sucker.

Preferably, the piston assembly 21 is directly driven by a mechanical device (for example, a motor, a cylinder, and the like), to linearly move up and down in a vertical direction. When a driving force is applied to a piston, the piston moves up and down inside the guide member 22, thereby generating a negative pressure in the sucking opening 14. This design is generally simple and stable, and is suitable for a scenario in which the movement track and the movement speed of the piston need to be precisely controlled.

Further, design of this system is simple, and intermediate mechanical components are reduced, so that complexity and manufacturing costs are reduced. Because there are no intermediate components, the system has a lower friction loss. Therefore, efficiency is improved. By means of directly driving, the clitoral sucker can be quickly started and shut down, and has less space occupation. Therefore, the clitoral sucker is suitable for confined space.

Preferably, the movable member 212 of the piston assembly 21 is connected to an eccentric shaft 2112 via rotation of the motor 2111, to drive the movable member 212 to move up and down. Because of the connection to the eccentric shaft, the movable member 212 is indirectly associated with a rotary movement of the motor. Therefore, the piston assembly 21 may move up and down inside the guide member 22. The motor rotates via the eccentric shaft, to enable the movable member 212 connected to the eccentric shaft to periodically move up and down. Due to this design, the negative pressure in the sucking opening 14 can be adjusted and controlled by adjusting a rotation speed of the motor and the eccentric shaft. An advantage is that multi-function adjustment of the clitoral sucker and personalized customization of user experience are implemented via the precise control of the motor.

Further, by means of providing a stable reciprocating movement, the eccentric shaft is suitable for applications requiring a smooth and continuous movement. Due to a simple structure and high transmission efficiency, the eccentric shaft is suitable for a high-frequency reciprocating movement. A stroke of the piston may be changed by adjusting an eccentric distance, so that different application requirements can be flexibly satisfied. Due to firmness and durability, an eccentric shaft system is suitable for a long-time and high-load operating environment.

In a specific embodiment, the sucking opening 14 extends along the sucking direction to form an extension portion 141, and the extension portion 141 is attached to the guide member 22.

When the movable member 212 moves along the sucking direction, the movable member 212 pushes a pushing portion **212*a*, and configured to change a size of the sucking opening 14**.

Specifically, due to the design of the extension portion 141, fitness and comfort can be ensured when the sucking opening 14 is fitted to a genital of the user. This enables the sucking opening 14 to better adapt to anatomical structures of different individuals, providing more precise and effective sucking experience. When the clitoral sucker is in contact with the genitals, the extension portion 141 is fitted to the guide member 22. This ensures that the sucking opening 14 is completely sealed, so that a loss of negative pressure is effectively limited. In this design, when the movable member 212 moves along the sucking direction, attachment of the extension portion 141 ensures stability and sealing of the sucking opening 14, so that sucking effect is enhanced.

Further, the design of the pushing portion 212*a* allows the movable member 212 to adjust the size of the sucking opening 14 during movement, and thus the sucking strength and adaptability of the sucking opening 14 can be adjusted based on the needs of the user. This mechanism improves functionality of the clitoral sucker and personalized experience of the user. When the movable member 212 moves along the sucking direction, the special design of the pushing portion 212*a* enables the movable member 212 to push the extension portion 141 of the sucking opening 14, and then change the size or shape of the sucking opening 14. This adapts to different usage needs and body parts.

In a specific embodiment, the movable member 212 includes the pushing portion 212*a* and a connection portion 212*b* that are disposed in sequence along the sucking direction. An end 212*b*-1 of the connection portion 212*b* is disposed on the driving member 211.

The pushing portion 212*a* has one end disposed on the connection portion 212*b* and the other end extending along a direction close to the sucking opening 14, obliquely disposed, and abutting against the inner wall of the guide member 22.

The sucking opening 14 is a flexible layer, and when the piston assembly 21 moves, one end, away from the connection portion 212*b*, of the pushing portion 212*a* pushes the extension portion 141, to change the size of the sucking opening 14.

Specifically, the design of the pushing portion 212*a* and the connection portion 212*b* allows the movable member 212 to precisely control the shape and size of the sucking opening 14 during movement. The connection portion 212*b* is mounted on the driving member 211, and thus stability and reliability of power transmission are ensured. Due to the pushing portion 212*a*, the movable member 212 may directly change the size of the sucking opening 14 via a mechanical action. When the piston assembly 21 moves, the pushing portion 212*a* pushes the extension portion 141 along the sucking direction. In this process, due to the oblique design of the pushing portion 212*a*, the pushing portion 212*a* may adapt to a change in the inner wall of the guide member 22 during movement. This ensures that the sucking opening 14 is stably and precisely adjusted. Due to this mechanism, effect of the clitoral sucker can be dynamically adjusted based on the needs of the user or usage scenarios.

Further, in the design of the sucking opening 14 with the flexible layer, fitting to skin of the user and comfort of the clitoral sucker are improved, and the sucking force is more focused and effective. Tension and a shape of the flexible layer may be adjusted via the movement of the pushing portion 212*a*, thereby changing the size and negative pressure effect of the sucking opening 14. The piston assembly 21 extends while the pushing portion 212*a* is oblique, to finely adjust the flexible layer. A change in an angle of the pushing portion 212*a* during movement directly affects an adjustment on the shape of the sucking opening 14, and thus efficient performance of the clitoral sucker in various cases is ensured.

Further, due to deformation, the sucking opening 14 may be better fitted to the clitoral area of a female, and with the movement of the piston assembly 21, the sucking opening 14 is expanded and narrowed. In addition, when the expansion or narrowing of the sucking opening 14 matches the sucking force generated by the negative pressure, the clitoris may further be stimulated, which actually simulates real scenario effect.

In a specific embodiment, the included angle between the pushing portion 212*a* and the guide member 22 is defined as a, and 30°≤a≤60°.

Specifically, when the included angle a between the pushing portion 212*a* and the guide member 22 is 30° to 60°, stability of the pushing force can be maintained while the sucking opening 14 is pushed and deformed. In this angle range, by means of optimizing a transfer direction of a force, the sucking opening 14 can be pushed to effectively generate the negative pressure, and a more stable pushing force can be maintained in the pushing process. This avoids unstable sucking force caused by a large or small pushing force.

Further, excessive friction between the pushing portion 212*a* and the inner wall of the guide member 22 can be reduced via a suitable included angle, thereby reducing abrasion. This helps to prolong service life of the clitoral sucker, and reduces costs of failures and maintenance caused by abrasion of components. In addition, due to the included angle after being optimized, the pushing portion 212*a* can push the sucking opening 14 with a small force, so that utilization efficiency of energy is improved. This means that with same driving energy, better sucking effect can be achieved, or with a same sucking force, energy consumption is low.

Further, due to a suitable included angle, impact produced when the pushing portion 212*a* is in contact with the inner wall of the guide member 22 can be reduced, and vibration and noise are reduced. This is particularly important for enhancing user experience, especially in a use scenario of a sex toy. The suitable included angle ensures that the pushing portion 212*a* is closely attached to the inner wall of the guide member 22 during movement, thereby improving sealing effect and preventing air leakage. Stable sealing effect helps to maintain a lasting and strong sucking force.

In a specific embodiment, the movable member 212 further includes a first sealing portion 212*c*. The first sealing portion 212*c* is disposed at an end, close to the sucking opening 14, of the pushing portion 212*a*, and abuts against the inner wall of the guide member 22.

Specifically, the first sealing portion 212*c* is a part of the movable member 212, and is generally configured to ensure good sealing during movement of the pushing portion 212*a*, and ensure that there is no air leakage during the movement of the piston assembly 21, thereby maintaining stability and strength of the negative pressure. This improves working efficiency of the clitoral sucker and user experience.

Further, when the included angle between the pushing portion 212*a* and the guide member 22 is 30° to 60°, the sealing portion may better abut against inside the guide member 22, and is in close contact with the inner wall of the guide member 22, to form a solid sealing structure. Due to the solid sealing structure, when the pushing portion 212*a* moves along the sucking direction, the pushing force is stably transferred. This avoids dispersion and weakening of the pushing force, and enables the sucking opening 14 to be more efficiently deformed, so that negative pressure effect is more significant.

In a specific embodiment, the clitoral sucker further includes a flow rate adjustment assembly 30. The flow rate adjustment assembly 30 is disposed in the guide member 22 and attached to the inner wall of the guide member 22.

Figure 8:
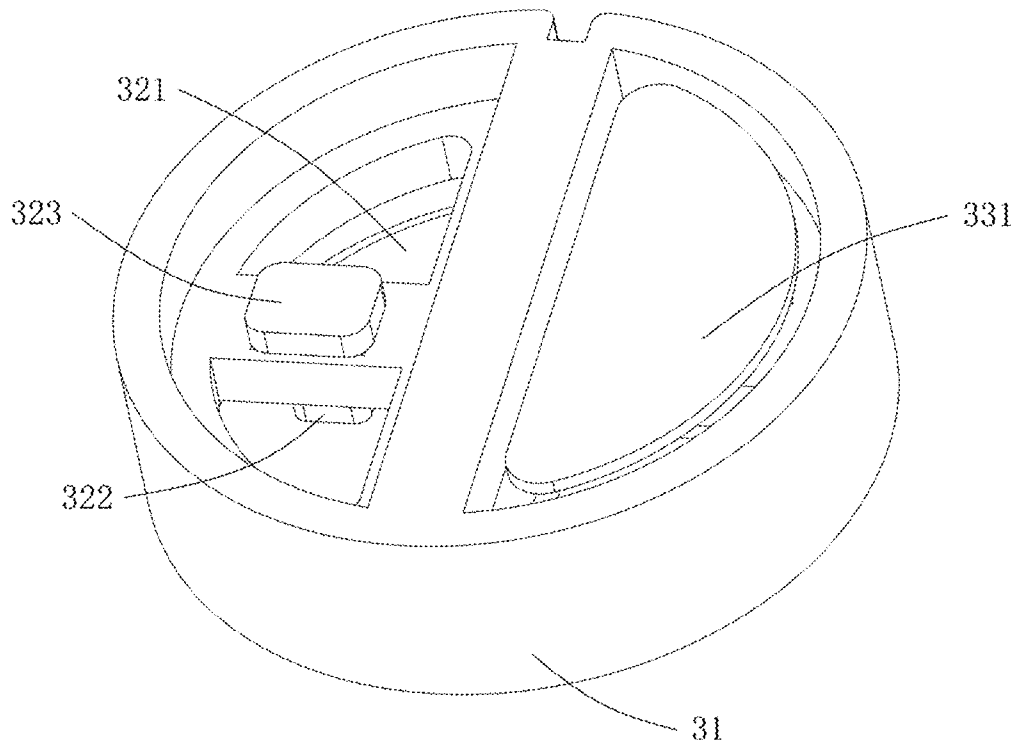
FIG. 8 is a three-dimensional diagram of a structure of a flow rate adjustment assembly of the clitoral sucker in FIG. 1.
Figure 9:
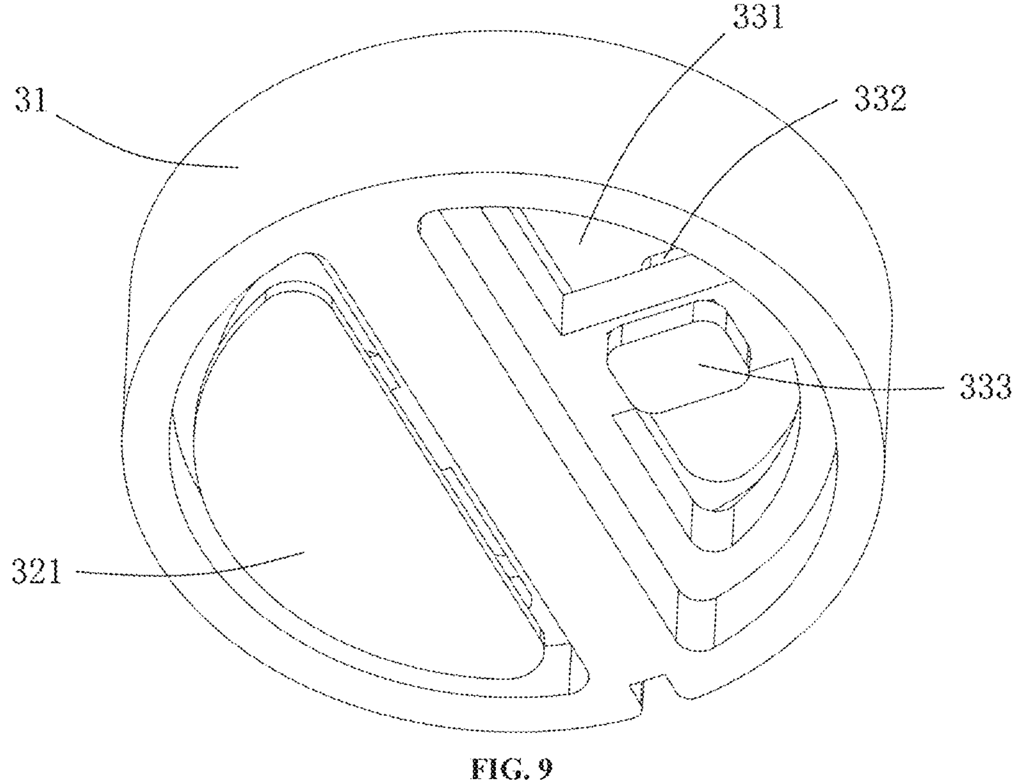
FIG. 9 is a three-dimensional diagram of a structure of a flow rate adjustment assembly of the clitoral sucker in FIG. 1.

Referring to FIGS. 8-9, the flow rate adjustment assembly 30 includes a holder 31, and a first flow-limiting valve 32 and a second flow-limiting valve 33 that are disposed on the holder 31.

The first flow-limiting valve 32 and the second flow-limiting valve 33 are disposed on two sides of the holder 31 along a centerline of the holder 31, and are both movably connected to the holder 31.

Specifically, the flow rate regulating valve may control a speed of an air flow, and may adjust sucking strength and sucking frequency. The flow rate adjustment assembly 30 is secured in the guide member 22, and fitted to the inner wall of the guide member 22, to ensure stability of a position of the flow rate adjustment assembly, and ensure accuracy and consistency of the adjustment on the air flow. This avoids the flow rate adjustment assembly 30 from moving or loosening during use. Further, the first flow-limiting valve 32 and the second flow-limiting valve 33 adjust flowing of the air flow, to respectively controlling the sucking force and a discharge speed. The first flow-limiting valve 32 and the second flow-limiting valve 33 are symmetrically distributed on two sides of the holder 31 along the centerline. This ensures balance and stability of the adjustment on the air flow, and enables the sucking process to be more stable and comfort.

In a specific embodiment, the first flow-limiting valve 32 includes a first windshield portion 321, a first connection portion 322, and a first limiting portion 323 that are connected in sequence. The second flow-limiting valve 33 includes a second windshield portion 331, a second connection portion 332, and a second limiting portion 333 that are connected in sequence.

The first windshield portion 321 is disposed on a side, away from the sucking opening 14, of the holder 31, and when the piston assembly 21 moves along a direction close to the sucking opening 14, the first windshield portion 321 is attached to the holder 31.

The second windshield portion 331 is disposed on a side, close to the sucking opening 14, of the holder 31, and when the piston assembly 21 moves along a direction away from the sucking opening 14, the second windshield portion 331 is attached to the holder 31.

Both the first limiting portion 323 and the second limiting portion 333 are configured to limit a movement distance of the flow limiting valve.

Specifically, the first windshield portion 321 is located on the side, away from the sucking opening 14, of the holder 31, to prevent the air flow from entering, and then affect the sucking strength and the sucking speed. The first connection portion 322 is connected to the windshield portion and the limiting portion, to maintain structural integrity. The first limiting portion 323 limits a movement distance of the first flow-limiting valve 32, and controls an adjustment range of the air flow. By adjusting a position of the first windshield portion 321 and a distance of the limiting portion, an entering amount of the air flow is precisely controlled, thereby adjusting intensity and frequency of the negative pressure of the sucking opening 14.

Further, the second windshield portion 331 is located on the side, close to the sucking opening 14, of the holder 31, to block an outlet of the air flow, and then affect a discharge speed of the air flow. The second connection portion 332 is connected to the windshield portion and the limiting portion, to ensure stability and functional integrity of the flow limiting valve. The second limiting portion 333 limits a movement distance of the second flow-limiting valve 33, to control a discharge range and a discharge speed of the air flow. By adjusting a position of the second windshield portion 331 and the distance of the limiting portion, a discharge amount of the air flow is precisely controlled, thereby adjusting the discharge speed and a discharge rhythm of the sucking opening 14.

Further, when the piston assembly 21 moves along the direction close to the sucking opening 14, the first windshield portion 321 is attached to the holder 31, to prevent excessive air flow from entering, and control an increase of the sucking force. When the piston assembly 21 moves along the direction away from the sucking opening 14, the second windshield portion 331 is attached to the holder 31, to limit the discharge of the air flow, and maintain a sucking rhythm and stability of the sucking.

In a specific embodiment, the piston assembly 21 further includes a sealing strip 23. The movable member 212 is provided with an annular sealing groove 24, and the sealing strip 23 is disposed in the annular sealing groove 24 and connected to the annular sealing groove 24 in an interference fit manner.

Specifically, the sealing strip 23 is mounted in the annular sealing groove 24 on the movable member 212, connected to the annular sealing groove 24 in an interference fit manner, and mainly used to prevent leakage of air or liquid from an edge of the annular sealing groove 24. This ensures sealing of an internal negative pressure system during movement of the piston assembly 21, prevents the clitoral sucker from losing negative pressure effect, or prevents leakage of the air flow. Therefore, working efficiency and stability of the clitoral sucker are improved, and the user can continuously obtain a stable sucking force and stable sucking effect during use. In addition, a leakage risk of the air flow is reduced, and a problem of reduction in performance or frequent maintenance because of poor sealing is resolved.

In a specific embodiment, the sealing strip 23 includes a fixing portion 231 and a second sealing portion 232. The fixing portion 231 is attached to the annular sealing groove 24, and the second sealing portion 232 has one end disposed on the fixing portion 231 and the other end obliquely disposed along a sucking direction and attached to the guide member 22.

The piston assembly 21 includes two the sealing strips 23. The two the sealing strips 23 are disposed in a mirror manner along the sucking direction.

Specifically, the fixing portion 231 is disposed at a base of the sealing strip 23 and attached to the annular sealing groove 24 on the movable member 212, to ensure that the sealing strip 23 is firmly secured on the movable member 212. The second sealing portion 232 has one end located on the fixing portion 231 and the other end obliquely disposed along the sucking direction and attached to the guide member 22, to implement a sealing function of the sealing strip 23 during movement.

Further, due to the obliquely disposing, the sealing strip 23 can be closely attached to the inner wall of the guide member 22, to effectively prevent leakage of air or liquid, and improve sealing performance of the clitoral sucker. In addition, due to the obliquely disposing, the sealing portion has a specific movable displacement. This reduces friction and abrasion during movement and prolongs service life of the sealing strip 23.

Further, an upper sealing strip 23 and a lower sealing strip 23 are disposed in a mirror manner. Therefore, when the pushing member moves up and down, uniform load and pressure distribution of the sealing strip 23 further enhance stability and effect of the sealing. Because the sealing strips 23 are symmetrically obliquely disposed, no matter how the piston assembly 21 moves, a sealing state inside the clitoral sucker can be maintained, and no air or liquid leaks due to movement.

The above described are merely implementations of the present disclosure. It should be noted here that those of ordinary skill in the art may make improvements without departing from the concept of the present disclosure, but such improvements should fall within the protection scope of the present disclosure.

What is claimed is:

1. A clitoral sucker, comprising:

a housing, comprising a body and a sucking portion disposed on the body, wherein the body is provided with an inner cavity, and the sucking portion is provided with a sucking opening connected to the inner cavity; wherein the body comprises at least one button that is configured to control an operating state of the clitoral sucker; and a negative pressure mechanism, comprising a piston assembly and a guide member, wherein the guide member is disposed in the inner cavity, and the piston assembly is disposed in the inner cavity, partially extends into the guide member, and is configured to move back and forth along a direction of the sucking opening, to generate a negative pressure in the sucking opening;

wherein the sucking opening extends along a sucking direction to form an extension portion, and the extension portion is attached to the guide member;

wherein the piston assembly comprises a driving member and a movable member; wherein the driving member comprises a motor and an eccentric shaft coupled with the motor;

wherein the movable member comprises a pushing portion and a connection portion that are disposed in sequence along the sucking direction, and an end of the connection portion is disposed on the driving member;

the pushing portion has two ends with a first end disposed on the connection portion and a second end extending along a direction close to the sucking opening and abutting against an inner wall of the guide member; and the sucking opening is a flexible layer, and when the piston assembly moves, the second end of the pushing portion pushes the extension portion, to change a size of the sucking opening.

2. The clitoral sucker according to claim 1, wherein the movable member extends into the guide member and is attached to the inner wall of the guide member through the pushing portion, and the driving member drives the movable member to move along the direction of the sucking opening.

3. The clitoral sucker according to claim 2, wherein the movable member, when moving along the sucking direction, pushes the pushing portion and is configured to change the size of the sucking opening.

4. The clitoral sucker according to claim 1, wherein an included angle between the pushing portion and the guide member is defined as $\alpha$, and $30° \leq \alpha \leq 60°$.

5. The clitoral sucker according to claim 1, wherein the movable member further comprises a first sealing portion, the first sealing portion being disposed at the second end of the pushing portion and abutting against the inner wall of the guide member.

6. The clitoral sucker according to claim 1, further comprising a flow rate adjustment assembly, wherein the flow rate adjustment assembly is disposed in the guide member and attached to the inner wall of the guide member;

the flow rate adjustment assembly comprises a holder, and a first flow-limiting valve and a second flow-limiting valve that are disposed on the holder; and the first flow-limiting valve and the second flow-limiting valve are disposed on the holder along a centerline of the holder, and are both movably connected to the holder.

7. The clitoral sucker according to claim 2, wherein the piston assembly further comprises a sealing strip, the movable member is provided with an annular sealing groove, and the sealing strip is disposed in the annular sealing groove and connected to the annular sealing groove in an interference fit manner;

wherein the movable member further comprises a first sealing portion disposed at the second end of the pushing portion.

8. The clitoral sucker according to claim 7, wherein the sealing strip comprises a fixing portion and a second sealing portion, and the fixing portion is attached to the annular sealing groove.

* * * * *